(12) United States Patent
Bayati et al.

(10) Patent No.: US 10,955,716 B2
(45) Date of Patent: Mar. 23, 2021

(54) ELECTROCHROMIC DEVICE INCLUDING CAPPING LAYER

(71) Applicant: HELIOTROPE TECHNOLOGIES, INC., Alameda, CA (US)

(72) Inventors: Amir Bayati, San Jose, CA (US); Xiaoliang Wang, San Leandro, CA (US); Yashraj Bhatnagar, Santa Clara, CA (US); Janina Motter, Palo Alto, CA (US); Guillermo Garcia, Oakland, CA (US); Le Sheng Nicholas Yiu, Alameda, CA (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 113 days.

(21) Appl. No.: 16/430,800

(22) Filed: Jun. 4, 2019

(65) Prior Publication Data

US 2020/0026139 A1    Jan. 23, 2020

Related U.S. Application Data

(60) Provisional application No. 62/699,412, filed on Jul. 17, 2018.

(51) Int. Cl.
*G02F 1/01* (2006.01)
*G02F 1/1523* (2019.01)
(Continued)

(52) U.S. Cl.
CPC .......... *G02F 1/1523* (2013.01); *G02F 1/1533* (2013.01); *G02F 2001/1502* (2013.01)

(58) Field of Classification Search
CPC ................. G02F 1/1523; G02F 1/1533; G02F 2001/1502; G02F 1/1525; G02F 2001/164; G02F 2202/20; G02F 2202/36; G02F 1/1524; G02F 2001/1536; G02F 1/1506; G02F 1/1514; G02F 1/1516; G02F 1/15165; G02F 1/157; G02F 1/161; G02F 1/163; G02F 2001/15145; G02F 2001/1517; G02F 2001/1518; G02F 2001/1552; G02F 2001/1555; G02F 2001/1557;
(Continued)

(56) References Cited

U.S. PATENT DOCUMENTS 9,785,031 B2   10/2017   Mattox et al.
9,791,760 B2   10/2017   Garcia et al.
(Continued)

*Primary Examiner* — William R Alexander
*Assistant Examiner* — Henry A Duong
(74) *Attorney, Agent, or Firm* — The Marbury Law Group, PLLC

(57) ABSTRACT

An electrochromic device includes an optically transparent first substrate, a first transparent conductor disposed on the first substrate, a counter electrode disposed on the first transparent conductor, an optically transparent, ionically conductive first capping layer disposed on the counter electrode, and configured to permit diffusion of alkali metal ions, and to block the diffusion of organic compounds and carbon, an optically transparent second substrate, a second transparent conductor disposed on the second substrate, a working electrode comprising electrochromic nanoparticles disposed on the second transparent conductor, and an electrolyte disposed between the first capping layer and the working electrode.

21 Claims, 2 Drawing Sheets

(51) Int. Cl.
*G02F 1/153* (2006.01)
*G02F 1/15* (2019.01)

(58) Field of Classification Search
CPC . G02F 1/15–163; G02F 2201/44; G09G 3/19; G09G 3/38
USPC ............. 359/265–275; 345/49, 105; 348/817
See application file for complete search history.

(56) References Cited

U.S. PATENT DOCUMENTS

| | | |
|---|---|---|
| 9,798,214 B2 | 10/2017 | Garcia et al. |
| 2015/0277202 A1* | 10/2015 | Mattox .................. G02F 1/1524 359/275 |
| 2016/0139475 A1* | 5/2016 | Garcia .................... C03B 27/00 359/275 |
| 2016/0139476 A1 | 5/2016 | Garcia et al. |
| 2016/0246153 A1 | 8/2016 | Garcia et al. |
| 2018/0364540 A1 | 12/2018 | Winoto et al. |

\* cited by examiner

ELECTROCHROMIC DEVICE INCLUDING CAPPING LAYER

FIELD

The present invention is generally directed to electrochromic (EC) devices including a capping layer configured to provide improved electrochemical stability and/or cycle life.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Some EC devices may include a working electrode, a solid state electrolyte, and a counter electrode sandwiched between two transparent conductor layers and an outer glass layer. The working electrode may include a metal oxide active material.

SUMMARY OF THE INVENTION

According to various embodiments, an electrochromic device includes an optically transparent first substrate, a first transparent conductor disposed on the first substrate, a counter electrode disposed on the first transparent conductor, an optically transparent, ionically conductive, first capping layer disposed on the counter electrode and configured to permit diffusion of alkali metal ions, and to block the diffusion of organic compounds and carbon, an optically transparent second substrate, a second transparent conductor disposed on the second substrate, a working electrode comprising electrochromic nanoparticles disposed on the second transparent conductor, and an electrolyte disposed between the first capping layer and the working electrode.

According to various embodiment, a method operating the device includes performing at least 10,000 bright/dark cycles (such as 10,000 to 25,000 cycles) without forming organic residue on the counter electrode while permitting alkali ions to diffuse through the first capping layer between the counter electrode and the electrolyte.

According to various embodiments, a method of forming an electrochromic (EC) device comprises forming a first transparent conductor on an optically transparent first substrate, forming a counter electrode on the first transparent conductor, forming an optically transparent, electrically and ionically conductive, first capping layer on the counter electrode and configured to permit diffusion of alkali metal ions, and to block the diffusion of organic compounds and carbon, forming a second transparent conductor on an optically transparent second substrate, forming a working electrode comprising electrochromic nanoparticles on the second transparent conductor, and forming an electrolyte layer between the working electrode and the first capping layer.

DETAILED DESCRIPTION OF THE EXEMPLARY EMBODIMENTS

Figure 1:
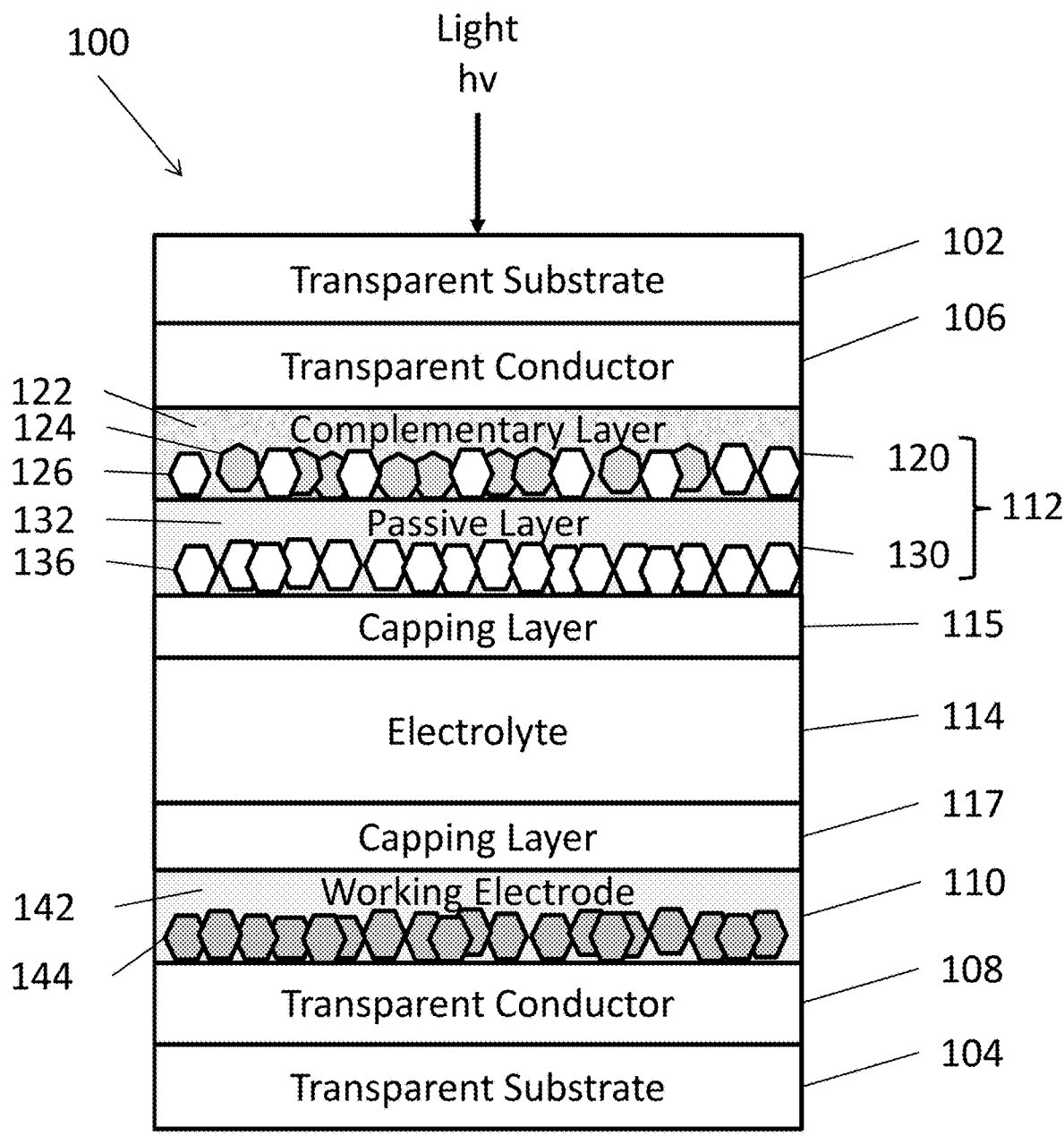
FIG. 1 is a schematic representation of an EC device, according to various embodiments of the present disclosure.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

EC Devices

FIG. 1 is schematic view of an EC device 100, according to various embodiments of the present disclosure. It should be noted that the thickness of the layers and/or size of the components of the devices in FIG. 1 are not drawn to scale or in actual proportion to one another other, but rather are shown as representations. The EC device 100 may be utilized in various applications, such as in vehicle windows, architectural facades, roof glazing (skylights, canopies, etc.), and appliances.

As part of the EC device fabrication process, the working electrode, electrolyte, and counter electrode may be exposed to high temperatures as part of a bending, tempering, and/or quenching process. For example, the EC device layers may be exposed to temperatures of 650° C. or higher. The present inventors realized that at these temperatures, some of the layers of the EC device, and in particular nanoparticles in the working electrode, may undergo sintering or other undesirable crystallization changes or phase transitions. These changes may negatively affect the operation or efficiency of the EC device. As used herein, the term "nanoparticle" includes any suitable nanoparticle shape, such as a sphere, rod (e.g., nanorod or nanowire), a three dimensional polygon and/or an irregular shape.

Referring to FIG. 1, the EC device 100 may include opposing first and second substrates 102, 104. The first and second substrates 102, 104 may be transparent substrates, such as substrates formed of optically transparent glass or plastic. However, in some embodiments, the substrates 102, 104 may be omitted. For example, the EC device 100 may refer to a coating formed of the various layers of FIG. 1 that are disposed between the substrates 102, 104.

First and second transparent conductors 106, 108 may be respectively disposed on the first and second substrates 102, 104. A counter electrode 112 may be disposed on the first transparent conductor 106, and a working electrode 110 may be disposed on the second transparent conductor 108. A first capping layer 115 may be disposed on the counter electrode 112. Optionally, a second capping layer 117 may be disposed on the working electrode 110. An electrolyte 114 may be disposed between the working electrode 110 and the counter electrode 112 (e.g., between the first capping layer 115 and the optional second capping layer 117.

The first and second transparent conductors 106, 108 may be formed from transparent conducting films fabricated using inorganic and/or organic materials. For example, the transparent conductors 106, 108 may include inorganic films of transparent conducting oxide (TCO) materials, such as indium tin oxide (ITO) or fluorine doped tin oxide (FTO). In other examples, organic films of transparent conductors 106, 108 may include graphene and/or various polymers.

Capping Layers

The capping layers 115, 117, may be configured to prevent contact between organic material of the electrolyte with the counter electrode 112 and/or working electrode 110. Accordingly, the capping layers 115, 117, may be optically transparent (e.g., at least 80% transparent to visible radiation), electrically conductive or electrically insulating (i.e., dielectric), and ionically conductive to alkali metal ions (e.g., permitting diffusion of alkali metal ions, such as lithium and/or sodium between the electrolyte 114 and the counter electrode 112 and/or working electrode 110). The capping layers 115, 117 may also permit diffusion of hydrogen ions.

The capping layers 115, 117 are also substantially impermeable, or impermeable to, non-ionic and/or organic materials, such as organic electrolyte materials (e.g., carbon atoms, oligomers and/or monomers). In other words, the capping layers permit the diffusion of alkali metal ions, such as Li and Na ions, but block diffusion of organic materials. Without wishing to be bound by a particular theory, it is believed that the capping layers prevent formation of organic residue on the nanoparticles of the electrodes 110 and/or 112. The organic residue is believed to degrade the performance of the electrodes 110 and/or 112 over time. Thus, the capping layer(s) improve the device durability over time, such as over 10,000 to 25,000 bright/dark cycles, by preventing a chemical reaction between the nanoparticles of the electrode(s) and the electrolyte.

The capping layers 115, 117 may be in the form of a dense, substantially non-porous film. For example, the capping layers 115, 117 may have a density of at least about 70%, such as at least about 80%, at least about 90%, or at least about 95%. In other words, the capping layers 115, 117 may have a porosity ranging from about 1% to about 30%, such as from about 1% to about 20%, or from about 1% to about 10%.

The capping layers 115, 117 may have a thickness ranging from about 5 nm to about 1000 nm, such as from about 5 nm to about 500 nm, from about 5 nm to about 300 nm, or from about 5 nm to about 200 nm, or from 50 nm to 100 nm.

In one embodiment, the capping layers 115 and/or 117 may comprise an optically transparent, electrically and ionically conductive material, such as a transparent conductive metal oxide or metal nitride. For example, the capping layers 115, 117 may comprise $WO_3$, $In_2O_3$, $CeO_2$, $CeVO_2$, $TiO_2$, $Fe_2O_3$, $V_2O_5$, ZnO, $Ta_2O_5$, $SnO_2$, indium tin oxide (ITO), fluorine-doped tin oxide (FTO), aluminum-doped zinc oxide (AZO), gallium zinc oxide (GZO), indium gallium zinc oxide (IGZO), molybdenum-doped indium oxide (IMO), non-stoichiometric compounds thereof, or mixtures thereof. In one embodiment, the capping layers 115, 117 may comprise vanadium oxide, tungsten oxide, tantalum oxide, fluorine doped tin oxide or indium oxide.

In another embodiment, the capping layers 115 and/or 117 may comprise an optically transparent, electrically insulating and ionically conductive material. Without wishing to be bound by a particular theory, it is believed that exposure of an EC device, such as the EC device 100, to UV and visible light may create a photo-current in the working electrode 110, or electron hole pairs. Electrons from the electrolyte 114 are thought to move to neutralize the holes created by the photons. Li ions from the electrolyte 114 may diffuse to neutralize the electrons created by the photons, causing extra positive change accumulation in the working electrode 110, (e.g., experience photochromism). This extra charge in the working electrode 110 may increase the voltage of the working electrode 110 with respect to the Li potential, which may cause breakdown of the electrolyte 117 and generation of bubbles. When this happens, the EC device 100 may stop working normally (e.g., the Tvis range may be reduced and delamination may occur adjacent the electrolyte 114).

Accordingly, the capping layers 115, 117 may be formed of an electrically insulating (i.e., dielectric) material configured to reduce or eliminate the transfer of electrons from the electrolyte 114 and to force the recombination of the generated electron-hole pairs. The reduction or elimination of electron transfer correspondingly reduces or eliminates the diffusion of Li ions and accumulation of extra charge in the working electrode 110, during light exposure, when a bias voltage (e.g., hold voltage) is applied between the electrodes and/or during cycling between bright and dark states and vice versa.

Therefore, in various embodiments, the capping layers 115, 117 may be formed of an optically transparent, ionically conductive, dielectric material (dielectric capping material). For example, the capping layers 115, 117 may be formed of lithium niobate ($LiNbO_3$), silicon nitride ($Si_3N_4$), silicon dioxide ($SiO_2$), silicon oxynitride (SiON), aluminum oxide ($Al_2O_3$), lithium phosphorous oxynitride (LiPON), lithium aluminum titanium phosphate (LATP), non-stoichiometric compounds thereof, or mixtures thereof. The density and thickness of the capping layers 115, 117 formed of such materials may remain in the ranges discussed above.

The capping layers 115, 117 may be deposited using any suitable deposition method. For example, the capping layers 115, 117 may be deposited by wet coating, sputtering, chemical vapor deposition, plasma enhanced chemical vapor deposition, atomic layer deposition, ion beam deposition, or the like. With respect to $LiNbO_3$, wet coating methods may be preferable. With regard to LATP, sputtering may be preferred using a target including $Li_2O$—$Al_2O_3$—$SiO_2$—$P_2O_5$—$TiO_2$. With regard to SiON, plasma enhanced CVD may be preferred to form an amorphous layer having general formula $SiO_xN_y$, where the composition may continuously vary between $SiO_2$ and $Si_3N_4$.

In embodiments including both of the capping layers 115, 117, one of the capping layers 115, 117 may be formed of the dielectric capping material, and the other of the capping layers 115, 117 may be formed of the electrically conductive capping material. For example, capping layer 115 may be formed of the electrically conductive capping material, and capping layer 117 may be formed of the dielectric capping material. In other embodiments, both of the capping layers 115, 117 may be formed of the dielectric capping material or the electrically conductive capping material.

Electrodes

The counter electrode 112 should be capable of storing enough charge to sufficiently balance the charge needed to cause visible tinting to the nanostructured transition metal oxide nanostructures in the working electrode 110. In various embodiments, the counter electrode 112 may be formed as a conventional, single component film, a multilayer film, a nanostructured film, or a nanocomposite layer. The counter electrode 112 may have a thickness ranging from about 0.25 μm to about 5 μm, such as from about 0.5 μm to about 3 μm.

In some embodiments, the counter electrode 112 may include a complementary layer 120 and a passive layer 130. The complementary layer 120 may include metal oxide nanoparticles disposed in a metal oxide matrix 122. In various embodiments, the complementary layer 120 may optionally include a flux material, as discussed in detail below with regard to the passive layer 130.

The matrix 122 may be formed of a lithium metal oxide. For example, the matrix 122 may be formed of $LiNbO_3$ (lithium niobate), $Li_2WO_4$ (lithium tungstate), $LiTaO_3$ (lithium tantalite), combinations thereof, or the like.

The nanoparticles may include complementary nanoparticles 124 comprising at least one complementary (e.g., color balancing) material, which may be transparent to NIR radiation, but which may be oxidized in response to application of a bias, thereby causing absorption of visible light radiation. Examples of such complementary counter electrode materials may include nickel oxide (e.g., $NiO_x$ where $1 \le x \le 1.5$, such as NiO), $Cr_2O_3$, $MnO_2$, $FeO_2$, $CoO_2$, $RhO_2$, or $IrO_2$.

In some embodiments, the complementary layer 120 may include passive nanoparticles 126 comprising at least one passive material that is optically transparent to both visible and NIR radiation during the applied biases. The passive nanoparticles 126 may operate as conductivity enhancer.

Examples of passive nanoparticles 126 may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, $V_2O_5$, or mixtures thereof.

In some embodiments, the complementary layer 120 may include NiO complementary nanoparticles 124 and $In_2O_3$ passive nanoparticles 126 disposed in a $LiNbO_3$ matrix 122. The complementary layer 120 may also optionally comprise a flux material comprising a LiRAP material, as described below.

The passive layer 130 may include mixture of a flux material 132 and passive nanoparticles 136. Herein, when a flux material is included in a component of the EC device 100, the flux material may form a mixture with other elements of the component, such as nanoparticles, may form a coating on such nanoparticles (e.g., a core-shell structure), and/or may form a matrix in which nanoparticles are disposed. In some embodiments, the flux material and nanoparticles may be impregnated in a metal oxide matrix of a corresponding component.

The flux material 132 may comprise any suitable material that melts at a temperature that is lower than a sintering, crystallization, and/or phase transition temperature of metal oxide nanoparticles included in the EC device 100. For, example, the flux material 132 may have a melting temperature ranging from about 25° C. to about 500° C., such as from about 50° C. to about 450° C., or from about 100° C. to about 400° C. For example, the flux material 132 may be configured to melt when the EC device 100 is heated, such as during a tempering or heat-bending process applied to the EC device 100.

The flux material 132 may comprise a high temperature stable material (e.g. an inorganic metal salt) configured to suppress undesirable nanoparticle crystallization, sintering, and/or phase transitions of metal oxide nanoparticles during heating at temperatures of up to about 700° C.). Accordingly, the flux material 132 may be configured to protect the optical properties of the EC device during heat-bending and/or heat-treatment processes. The flux material 132 may be configured to solidify from a molten state, such as when the EC device 100 cools, without degrading the optical properties of the EC device 100.

In some embodiments, the flux material 132 may comprise a lithium salt material. For example, the flux material 132 may comprise a Li-rich anti-perovskite (LiRAP) material. An anti-perovskite is a compound having a crystal structure like a conventional perovskite but with the unit cell having the positive and negative species reversed. In a perovskite structure, the unit cell is face centered cubic. The negative atoms normally sit on the face centers and positive ions sit in the corners. Additionally, there will be a third type of atom, a cation, in the center of the cubic unit cell. In an antiperovskite structure, the locations of cations and anions are reversed. In the antiperovskite structure, of the type described herein, oxygen or sulfur atoms, for example, reside at centers of the unit cell, halogen atoms sit at corners of the unit cell, and lithium ions reside in the face centers of the unit cell. It is believed that the face centered species may be the most mobile species in the unit cell.

According to various embodiments, the flux material 132 may include a LiRAP material having the formula $Li_3OX$, where X may be a halogen or a combination of halogens. For example, X may be F, Cl, Br, I, or any combination thereof. In some embodiments, the LiRAP material may be $Li_3OI$. In some embodiments, the LiRAP material may also include one or more dopant species. In some embodiments, the LiRAP material may be aliovalently doped by replacing a first anion in the base structure with a second anion that has a valence more positive than that of the first atom.

The LiRAP material of the flux material 132 may be formed from constituent lithium salts. For example, the LiRAP material may be formed from an oxygen-containing lithium salt and a halogen salt of lithium. Examples of the oxygen-containing lithium salt include lithium hydroxide (LiOH) lithium acetate ($C_2H_3LiO_2$), lithium carbonate ($Li_2CO_3$), lithium oxide ($Li_2O$), lithium perchlorate (Li-$ClO_4$), lithium nitrate ($LiNO_3$), or any combination thereof.

Examples of the halogen salt of lithium include lithium chloride (LiCl), lithium bromide (LiBr), lithium fluoride (LiF), lithium iodide (LiI), or any combination thereof. In some embodiments, the LiRAP material may be formed from LiOH and LiI.

The LiRAP material may reduce or prevent photocurrent (e.g., photochromism) due to UV and/or visible light exposure. While not wishing to be bound by a particular theory, it is believed that the LiRAP material may be more effective in preventing photochromism when the EC device 100 is static (e.g., when no voltage is applied thereto), as compared to when the EC device 100 is being cycled and/or a bias (e.g., hold) voltage is not being applied thereto. However, the inclusion of both the LiRAP material and at least one capping layer 115, 117 formed of the dielectric capping material in the EC device 100 is believed to unexpectedly provide additional protection against photochromism during application of a hold voltage and/or during cycling of the EC device 100.

The passive nanoparticles 136 may comprise at least one passive material that is optically transparent to both visible and NIR radiation during the applied biases. Examples of such passive counter electrode materials may include $CeO_2$, $CeVO_4$, $TiO_2$, indium tin oxide (ITO), $In_2O_3$ (Indium(III) oxide), $SnO_2$ (tin(IV) dioxide), manganese or antimony doped tin oxide, aluminum doped zinc oxide, ZnO (zinc oxide), gallium zinc oxide, indium gallium zinc oxide (IGZO), molybdenum doped indium oxide, $Fe_2O_3$, $V_2O_5$, or mixtures thereof.

In some embodiments, passive layer 130 may include a mixture of $CeO_2$ and $In_2O_3$ passive nanoparticles 136 and a LiRAP flux material 132. The passive layer 130 may also optionally include a $LiNbO_3$ matrix (not shown) in which the passive nanoparticles 136 and the flux material 132 are disposed.

In various embodiments, the working electrode 110 may include a mixture of a flux material 142 and an electrochromic material comprising doped or undoped transition metal oxide nanoparticles 144. The working electrode 110 may optionally include a lithium metal oxide matrix (not shown) that may include any of the materials as described above with respect to the matrix 122.

The flux material 142 may include any of the materials described above with respect to the flux material 132. In one embodiment, the flux material 142 may be in the form of a matrix layer that surrounds the nanoparticles 144. In other embodiments, the flux material 142 may surround the nanoparticles 144 in a core-shell configuration, with the flux material 142 forming shells around nanoparticle cores.

In the various embodiments, the transition metal oxide nanoparticles 144 may be a ternary composition of the type AxMzOy, where M represents a transition metal ion species in at least one transition metal oxide, and A represents at least one optional dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the transition metal oxide nanoparticles may include doped or undoped $WO_{3-x}$, $Cs_xWO_{3-x}$, and/or $NbO_x$, nanoparticles, where $0 \leq x \leq 0.33$, such as $0 \leq x \leq 0.1$. Thus, when x=0, $WO_{3-x}$ is $WO_3$.

In various embodiments, the at least one optional dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanoparticle shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 114 and the transition metal oxide nanostructures of the working electrode 110, as a result of the applied voltage. Specifically, the application of voltage within the particular range may cause the second dopant species to intercalate and deintercalate the transition metal oxide nanostructures. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species. For example, if the transition metal oxide nanoparticles 144 are $WO_{3-x}$ nanoparticles, the dopant may be Li intercalated from the electrolyte 114.

In various embodiments, the shape, size, and doping levels of transition metal oxide nanoparticles 144 may be tuned to further contribute to the spectral response by the device. For instance, the use of rod versus spherical nanoparticles 144 may provide a wider level of porosity, which may enhance the switching kinetics. Further, a different range of dynamic plasmonic control may occur for nanostructures with multiple facets, such as at least 20 facets.

Various embodiments may also involve alternation of the nanoparticles 144 that form the working electrode 110. For example, the nanostructures may be nanoparticles of various shapes, sizes and/or other characteristics that may influence the absorption of NIR and/or visible light radiation. In some embodiments, the nanoparticles 144 may be isohedrons that have multiple facets, preferably at least 20 facets.

In some embodiments, the transition metal oxide nanoparticles 144 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 110. For example, the working electrode 110 may include both cubic and hexagonal cesium doped tungsten oxide bronze nanoparticles. In alternative embodiments, the working electrode 110 may include either cubic or hexagonal cesium doped tungsten oxide nanoparticles. For example, the working electrode 110 may include cubic cesium-doped tungsten oxide (e.g., $Cs_1W_2O_{6-x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 110 may include undoped cubic tungsten oxide (e.g., $WO_{3-x}$) nanoparticles where $0 \leq X \leq 0.1$.

In some embodiments, at least one nanoparticle amorphous transition metal oxide may be included in the working electrode 110 in addition to the doped-transition metal oxide nanoparticles 144. An example of such material in the working electrode 110 may be, but is not limited to, nanostructured amorphous niobium oxide, such as NbO, $NbO_2$, or $Nb_2O_5$. In an alternative embodiment, the working electrode 110 may further include a matrix material, such as lithium niobate.

The nanoparticles 144 of the working electrode 110 may modulate transmittance of NIR and visible radiation as a function of applied voltage by operating in two different modes. For example, a first mode may be a highly solar transparent ("bright") mode in which the working electrode 110 is transparent to NIR radiation and visible light radiation. A second mode may be a visible blocking ("dark") mode in which the working electrode 110 absorbs radiation in the visible spectral region and at least a portion of the NIR spectral region. In an example, application of a first voltage having a negative bias may cause the electrochromic device to operate in the dark mode, blocking transmittance of visible and NIR radiation at wavelengths of around 780-2500 nm. In another example, application of a second voltage having a positive bias may cause the electrochromic device to operate in the bright mode, allowing transmittance of radiation in both the visible and NIR spectral regions. In various embodiments, the applied voltage may be between −2V and 2V. For example, the first voltage may be −2V, and the second voltage may be 2V.

Electrolyte

According to various embodiments of the present disclosure, the electrolyte 114 may be a solid polymer electrolyte (e.g., cross-linked polymer electrolyte) or a gel electrolyte. Herein, the term "gel", as used herein with respect to the electrolyte 114, refers to a substantially dilute cross-linked system that exhibits no flow when in the steady-state. By weight, a gel may be mostly liquid, but may behave like a solid due to a three-dimensional cross-linked network within the liquid. The crosslinking within the fluid may give a gel its structure (hardness) and contributes to the adhesive stick (tack).

In various embodiments, the gel electrolyte 114 may include a polymer network (e.g. backbone) and an ionically conductive phase disposed therein. The gel electrolyte 114 may optionally include at least one additive. The gel electrolyte 114 may have an electrical conductivity at room temperature ranging from about 1 μS/cm to about 10 mS/cm. The gel electrolyte 114 may have a modulus of elasticity that ranges from about 10 kPa to about 50 MPa. The gel electrolyte 114 may have shear strength when disposed on a transparent conductive oxide substrate that ranges from about 1 psi to about 1000 psi.

According to various embodiments, the polymer network may include crosslinked monomers and/or oligomers. Herein, "monomers" monomers refer to both monomers and oligomers. For example, the polymer network may include crosslinked structural monomers and adhesion promoting monomers (e.g., adhesion promoters). The ionically conductive phase may be disposed within the polymer network.

In some embodiments, the structural monomers may include polyurethane acrylate oligomers. The polyurethane acrylate may be formed from liquid polymer precursors, such as aliphatic ethers, aliphatic esters, aromatic ethers, and/or aromatic esters. In other embodiments, the polymer network may also include other structural monomers. For example, other structural monomers that may be included in the polymer network include, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), or the like.

The adhesion promoting monomers may include, for example, isobornyl acrylate (IBOA), ethoxylated nonylphenol acrylate, poly(ethylene glycol) diacrylate (PEGDA), trimethylolpropane triacrylate (TMPTA), ethoxyethoxyethyl acrylate, tripropylene glycol diacrylate (TPGDA), butyl acrylate (BA), hexanediol diacrylate (HDDA), and mixtures thereof. The adhesion promoting monomers may be configured to promote electrolyte adhesion between the structural monomers, and between the gel electrolyte 112 and an adjacent substrate, such as the working electrode 110 and/or the counter electrode 112.

The ionically conducting phase may include a plasticizer, an electrolyte salt, and/or an initiator. In some embodiments, the ionically conductive phase may include one or more optional additives, such as sacrificial redox agents (SRA).

In some embodiments, the plasticizer may include glymes (tetraglyme, triglyme, diglyme etc.), sulfolane, propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof. In an embodiment, the plasticizer may include at least one of tetraglyme and an alkyl hydroperoxide.

In various embodiments, the plasticizer may include an ionic liquid. The ionic liquid may include, for example, N-methyl-N-butylpyrrolidinium bis(trifluoromethylsulfonyl)imide (Py14TFSI), imidazolium bis(trifluoromethylsulfonyl)imide ([Im][TFSI]), or a combination thereof.

In some embodiments, the plasticizer may act as a solvent and/or may include an additional solvent. For example, the plasticizer may include tetraglyme, sulfolane, propylene carbonate, or mixtures thereof mixed with the ionic liquid. In some embodiments, the gel electrolyte 114 may initially contain an additional solvent, such as butanol, which may be evaporated off during assembly of, or after the electrochromic device is assembled.

In some embodiments, the electrolyte salt may contain, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, the electrolyte salt may contain a lithium salt and/or a sodium salt.

In various embodiments, the lithium salt may be, for example, lithium bis(trifluoromethanesulfonyl)imide (LiTFSI), lithium tetrafluoroborate ($LiBF_4$), lithium bis(oxalate)borate (LiBOB), lithium hexafluorophosphate (LiPF$_6$), lithium difluorooxalatoborate (LiDFOB), or mixtures thereof.

The ionically conductive phase may include an additive such as one or more SRAs. Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol, etc.), other substituted benzyl alcohols, indoline, 1,2,3,4-tetrahydrocarbazole, N,N-dimethylaniline, 2,5-dihydroanisole, methylthiol alcohol, or the like. In various embodiments, the SRA molecules may create an air stable layer that does not require an inert environment to maintain charge.

The gel electrolyte 114 may be formed by curing a gel electrolyte precursor composition. The gel electrolyte precursor composition, which may also be referred to as a "precursor composition", may be cured by the application of heat and/or UV light. Herein, the "gel electrolyte precursor composition" and "precursor composition" may refer to flowable liquid compositions that are not cross-linked, or are partially crosslinked (e.g., at least 50% of the crosslinkable polymers and/or oligomers remain un-crosslinked), but that may be cured to form a gel electrolyte.

The precursor composition may include polymer network precursors (e.g., structural monomers and adhesion promoting monomers used to form the polymer network) and an ionically conducting phase. The ionically conducting phase may include a plasticizer, an electrolyte salt, an initiator, optionally one or more additives, and any combinations thereof.

In various embodiments, the curing may be facilitated by the initiator. The initiator may include, for example, 2,2-Dimethoxy-2-phenylacetophenone, phenylphosphineoxide, benzoyl peroxide, or a mixture thereof.

In some embodiments, the precursor composition may include a viscosity controlling agent, such as a thickener, to increase the viscosity thereof. For example, the precursor composition may have a viscosity ranging from about 1,000 cP to about 90,000 cP, at room temperature. For example, the viscosity may range from about 10,000 cP to about 80,000 cP, such as from about 25,000 cP to about 60,000 cP.

For example, if the viscosity is less than about 1,000 cP, the thickness of the gel electrolyte 114 may be inconsistent. For example, the center of the electrolyte 114 may be thinner than edge regions of the electrolyte, which may complicate a subsequent lamination process using to construction an EC device 100, by forming gaps between the electrolyte and an adjacent substrate laminated thereto. On the other hand, when the viscosity is greater than about 90,000 cP, process bubbles in the electrolyte 114 may be difficult to remove and it may be difficult to apply a sealant around the electrolyte 114 during subsequent lamination processes.

EC Device Characteristics and Manufacturing

Figure 2:
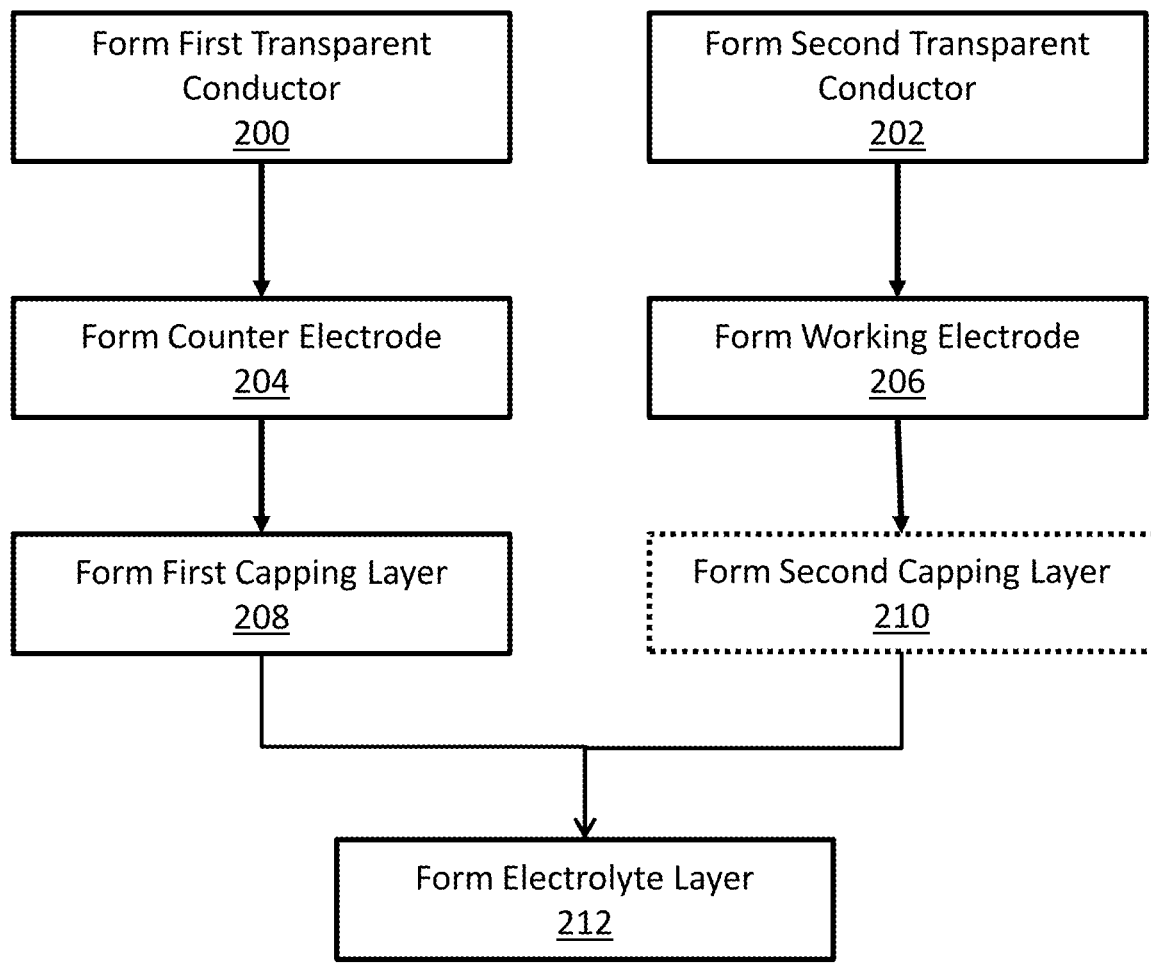
FIG. 2 is a block diagram showing a method of forming EC device, according to various embodiments of the present disclosure.

FIG. 2 is a block diagram illustrating a method of forming an EC device, such as the EC device 100 of FIG. 1, according to various embodiments of the present disclosure. Referring to FIGS. 1 and 2, in step 200, the method includes forming a first transparent conductor 106 on a first transparent substrate 102. In step 202, the method includes forming a second transparent conductor 108 on a second substrate 104.

In step 204, the method includes forming a counter electrode 112 on the first transparent conductor 106. In step 206, the method includes forming a working electrode 110 on the second transparent conductor 108.

The transparent conductors 106, 108, working electrode 110, and counter electrode 112 may be formed using various processes, such as any suitable coating and/or deposition processes. For example, a solution deposition process may be used to form these elements. In other embodiments, the electrodes 110, 112 may be formed by other processes. For example, one or both of the electrodes 110, 112 and/or coatings disposed thereon may be formed by physical or chemical vapor deposition processes. For example, the working electrode 110 may be formed by solution deposition and the counter electrode 112 may be formed by sputtering.

Steps 204 and 206 may include curing the transparent conductors 106, 108, working electrode 110, and counter electrode 112 using, for example, a thermal curing process.

In some embodiments, step 204 and/or step 206 may optionally include doping the counter electrode 112 and/or working electrode 110 with Li ions using any suitable doping process. For example, the Li doping may include a physical vapor deposition process, such as sputtering, an evaporation process, an ion implantation process, or an electrochemical process. The Li doping may occur after electrodes 110, 112 are cured, or during the curing process.

During the Li doping, the counter electrode 112 and/or working electrode 110 may be heated to a temperature ranging from about 225° C. to about 275° C., such as a temperature ranging from about 235° C. to about 265° C., or about 240° C. to about 250° C. The amount of doping may be set based on a desired optical range of the EC device (e.g., a desired bright state visible light transmission percentage and a desired dark state visible light transmission percentage).

The Li doping may result in an EC device that does not require charging prior to steady-state operation (e.g., during an initial break in layer deposition process). In other words, the Li doping may reduce manufacturing costs since such an initial break in layer deposition process and/or the initial charging the EC device may be omitted. The Li doping may also reduce and/or prevent electrolyte degradation that may occur during a conventional initial break in layer deposition process. The Li doping may additionally improve EC device stability and durability. Accordingly, the Li doping thereby allowing for the use of electrolytes that are more susceptible to breakdown during charging in an initial break in layer deposition process, since which a break is not used in this embodiment.

In step 208, the method includes forming a first capping layer 115 on the counter electrode 112. The method may optionally include step 210, which includes forming a second capping layer 117 on the working electrode 110.

The capping layers 115, 117 may be formed by any suitable deposition process, such as solution deposition, chemical vapor deposition (CVD), or physical vapor deposition (PVD) (e.g., sputtering). For example, the capping layers 115, 117 may be formed by solution deposition, metal-organic CVD (MOCVD), sputtering, electron beam evaporation, laser ablation, or the like.

In step 212, the method may include forming an electrolyte layer 114 between the first substrate 102 and the second substrate 104, such as between the first capping layer 115 and the working electrode 110 and/or second capping layer 117. The electrolyte layer 114 may be formed by curing an electrolyte precursor.

For example, the electrolyte layer 114 may be formed by coating the electrolyte precursor solution over the layer coated first and/or second substrates, and then laminating the first and second substrates together. The precursor solution may be cured before or after the lamination, to form the electrolyte. In some embodiments, the precursor solution may be filled in a space formed between the layer coated first and second substrates, and then cured to form the electrolyte layer.

In other embodiments, the electrolyte precursor solution may be coated on a third substrate, cured, and then removed from the third substrate as a free-standing electrolyte. The free-standing electrolyte may then be inserted and/or sealed between the first and second substrates.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic (EC) device comprising:
   an optically transparent first substrate;
   a first transparent conductor disposed on the first substrate;
   a counter electrode disposed on the first transparent conductor;
   an optically transparent, ionically conductive, first capping layer disposed on the counter electrode, and configured to permit diffusion of alkali metal ions, and to block diffusion of organic compounds and carbon;
   an optically transparent second substrate;
   a second transparent conductor disposed on the second substrate;
   a working electrode comprising electrochromic nanoparticles disposed on the second transparent conductor; and
   an electrolyte disposed between the first capping layer and the working electrode.

2. The EC device of claim 1, wherein in the first capping layer is electrically conductive and comprises tantalum oxide, vanadium oxide, tungsten oxide, indium oxide, fluorine doped tin oxide, or mixtures thereof.

3. The EC device of claim 1, wherein in the first capping layer is electrically insulating and comprises lithium niobate, silicon nitride, silicon dioxide, silicon oxynitride, aluminum oxide, lithium phosphorous oxynitride, lithium aluminum titanium phosphate, or mixtures thereof.

4. The EC device of claim 1, wherein in the first capping layer has a thickness ranging from about 5 nm to about 1,000 nm, and the first capping layer has a porosity of less than 30%.

5. The EC device of claim 1, wherein:
   in the first capping layer has a thickness ranging from about 50 nm to about 100 nm; and
   the porosity of the first capping layer ranges from about 1% to about 10%.

6. The EC device of claim 1, further comprising an optically transparent and ionically conductive, second capping layer disposed between the working electrode and the electrolyte, and having a porosity of less than 30%, and configured to permit diffusion of alkali metal ions, and to block the diffusion of organic compounds and carbon.

7. The EC device of claim 1, wherein a second capping layer is electrically conductive and comprises tantalum oxide, vanadium oxide, tungsten oxide, indium oxide, fluorine doped tin oxide or mixtures thereof.

8. The EC device of claim 1, wherein a second capping layer is electrically insulating and comprises lithium niobate, silicon nitride, silicon dioxide, silicon oxynitride, aluminum oxide, lithium phosophorous oxynitride, lithium aluminum titanium phosphate, or mixtures thereof.

9. The EC device of claim 1, wherein the working electrode further comprises a flux material configured to prevent or reduce sintering of the nanoparticles at a temperature of up to about 700° C.

10. The EC device of claim 9, wherein:
    the flux material forms a matrix in which the nanoparticles are disposed;
    the flux material and the nanoparticles form a composite; or
    the flux material forms shells around the nanoparticles.

11. The EC device of claim 9, wherein the flux material comprises a lithium-rich anti-perovskite (LiRAP) material represented by the formula $Li_3OX$, wherein X is F, Cl, Br, I, or any combination thereof.

12. The EC device of claim 1, wherein:
    the nanoparticles comprise $WO_{3-x}$, $Cs_xWO_{3-x}$, or $NbO_x$, where $0 \leq x \leq 0.33$; and
    the electrolyte comprises a gel electrolyte comprising polyurethane acrylate and a lithium salt.

13. The EC device of claim 1, wherein the counter electrode comprises:
    a passive layer disposed on the first capping layer and comprising passive nanoparticles and a flux material; and
    a complementary layer disposed on the passive layer and comprising complementary nanoparticles and a matrix comprising a lithium metal oxide.

14. The EC device of claim 13, wherein:
    the complementary nanoparticles comprise $NiO_x$ where $1 \leq x \leq 1.5$, $Cr_2O_3$, $MnO_2$, $FeO_2$, $CoO_2$, $RhO_2$, $IrO_2$, or a combination thereof; and
    the passive nanoparticles comprise $CeO_2$ nanoparticles and $In_2O_3$ nanoparticles.

15. The EC device of claim 13, wherein the complementary layer further comprises a flux material comprising a lithium-rich anti-perovskite (LiRAP) material represented by the formula $Li_3OX$, wherein X is F, Cl, Br, I, or any combination thereof.

16. The EC device of claim 13, wherein
    the lithium metal oxide of the matrix comprises $LiNbO_3$, $Li_2WO_4$, $LiTaO_3$, or any combination thereof; and
    the passive layer further comprises a matrix comprising $LiNbO_3$, $Li_2WO_4$, $LiTaO_3$, or any combination thereof.

17. A method of forming an electrochromic (EC) device, the method comprising:
    forming a first transparent conductor on an optically transparent first substrate;
    forming a counter electrode on the first transparent conductor;
    forming an optically transparent, ionically conductive, first capping layer on the counter electrode, and configured to permit diffusion of alkali metal ions, and to block diffusion of organic compounds and carbon;
    forming a second transparent conductor on an optically transparent second substrate;
    forming a working electrode comprising electrochromic nanoparticles on the second transparent conductor; and
    forming an electrolyte layer between the working electrode and the first capping layer.

18. The method of claim 17, wherein:
the first capping layer is electrically conductive or electrically insulating;
the first capping layer is formed by solution deposition, chemical vapor deposition (CVD) or physical vapor deposition (PVD);
the first capping layer has a thickness ranging from about 5 nm to about 1000 nm; and
the first capping layer having a porosity of less than 30%.

19. The method of claim 17, further comprising before the forming an electrolyte layer, forming an optically transparent, ionically conductive, second capping layer on the counter electrode, the second capping layer having a porosity of less than 30%, and configured to permit diffusion of alkali metal ions, and to block the diffusion of organic compounds and carbon.

20. The method of claim 1, further comprising at least one of:
doping the counter electrode with Li ions before forming the first capping layer;
doping the working electrode with Li ions before forming a second capping layer; or
doping the counter electrode with Li ions before forming the first capping layer and doping the working electrode with Li ions before forming the second capping layer.

21. A method of operating the EC device of claim 1, comprising performing at least 10,000 bright/dark cycles without forming organic residue on the counter electrode while permitting alkali ions to diffuse through the first capping layer between the counter electrode and the electrolyte.

* * * * *